United States Patent [19]

Bernhardt

[11] 4,398,177
[45] Aug. 9, 1983

[54] METHOD AND CIRCUIT ARRANGEMENT FOR FORMATION OF FEATURES FOR AUTOMATIC CHARACTER RECOGNITION

[75] Inventor: Lutz Bernhardt, Constance, Fed. Rep. of Germany

[73] Assignee: Computer Gesellschaft Konstanz mbH, Fed. Rep. of Germany

[21] Appl. No.: 233,386

[22] Filed: Feb. 11, 1981

[30] Foreign Application Priority Data

Feb. 12, 1980 [DE] Fed. Rep. of Germany ....... 3005206

[51] Int. Cl.³ .............................................. G06K 9/50
[52] U.S. Cl. ...................................... 382/18; 382/46; 382/62
[58] Field of Search ................ 340/146.3 Y,146.3 AC, 340/146.3 R, 146.3 MA, 146.3 D

[56] References Cited

U.S. PATENT DOCUMENTS

| | | | |
|---|---|---|---|
| 3,165,718 | 1/1965 | Fleisher | 340/146.3 Y |
| 3,381,274 | 4/1968 | Quade et al. | 340/146.3 Y |
| 3,845,466 | 10/1974 | Hong | 340/146.3 Y |
| 4,164,728 | 8/1979 | Marsh | 340/146.3 Y |
| 4,218,673 | 8/1980 | Yoshida | 340/146.3 Y |
| 4,295,120 | 10/1981 | Yoshida | 340/146.3 Y |

FOREIGN PATENT DOCUMENTS

1135226 8/1962 Fed. Rep. of Germany .

OTHER PUBLICATIONS

Buyle-Bodin et al., "A Letter Encoder after Analysis of Geometrical Characters," *Proc. of Conf. on Machine Perception of Patterns*, Apr. 1972, pp. 216–222.
Ruppert, "Character Recognition Using Density Sums," *IBM Tech. Disclosure Bulletin*, vol. 18, No. 7, Dec. 1975, pp. 2190–2191.

*Primary Examiner*—Leo H. Boudreau
*Attorney, Agent, or Firm*—Hill, Van Santen, Steadman, Chiara & Simpson

[57] ABSTRACT

For formation of features for automatic character recognition an image pattern memory matrix corresponding to a respective character is read-out analogous to a sampling at different sampling angles with a multitude of section lines proceeding in accordance with said sampling angles. The evaluation per sampling angle ensues in such manner that there are determined and supplied to a classifier for character recognition the number of the section lines intersecting the character at least once (sampling range); the sum of all section line intersections; the center of gravity of the sampling range; and the scatter within the sampling range.

2 Claims, 6 Drawing Figures

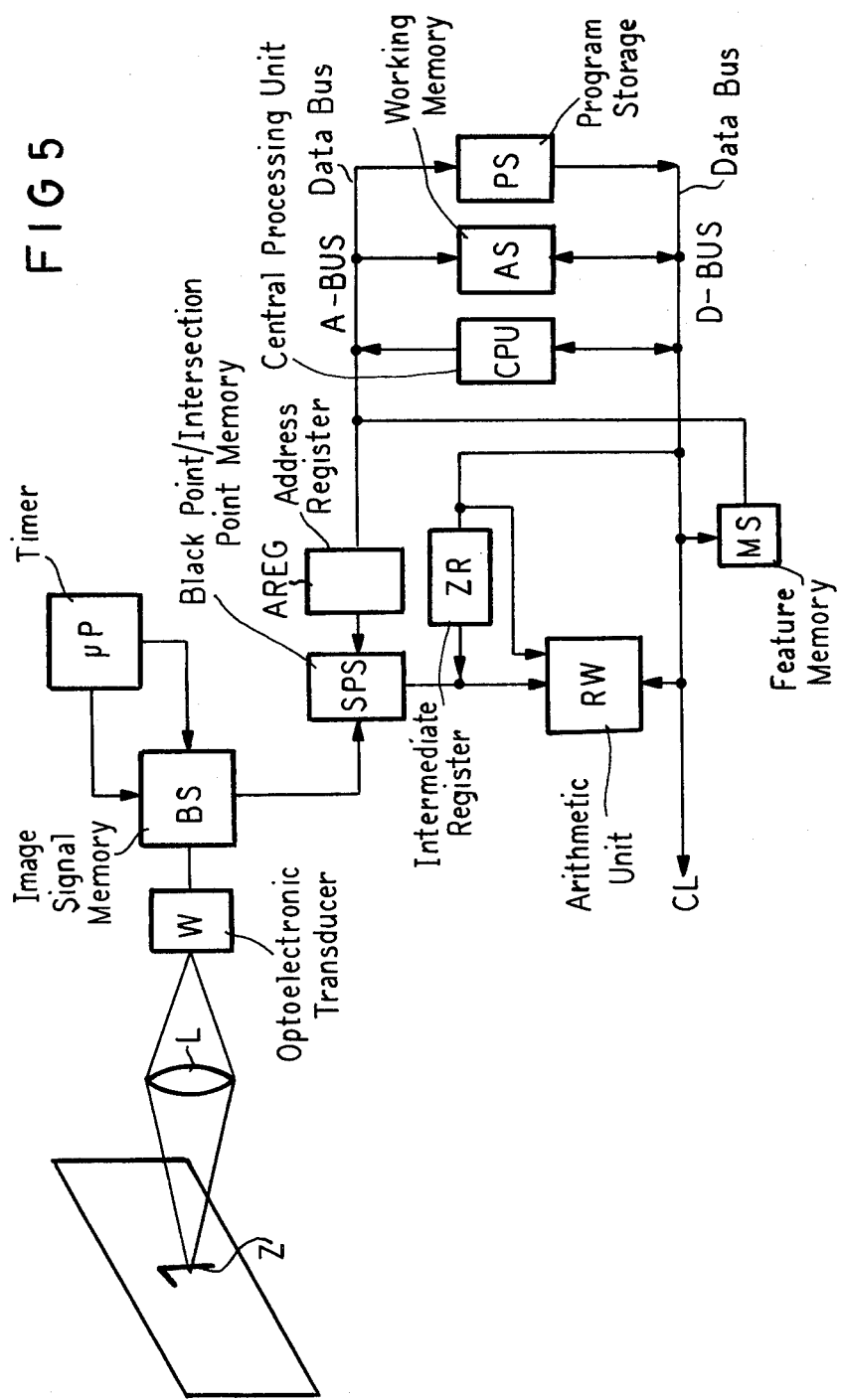

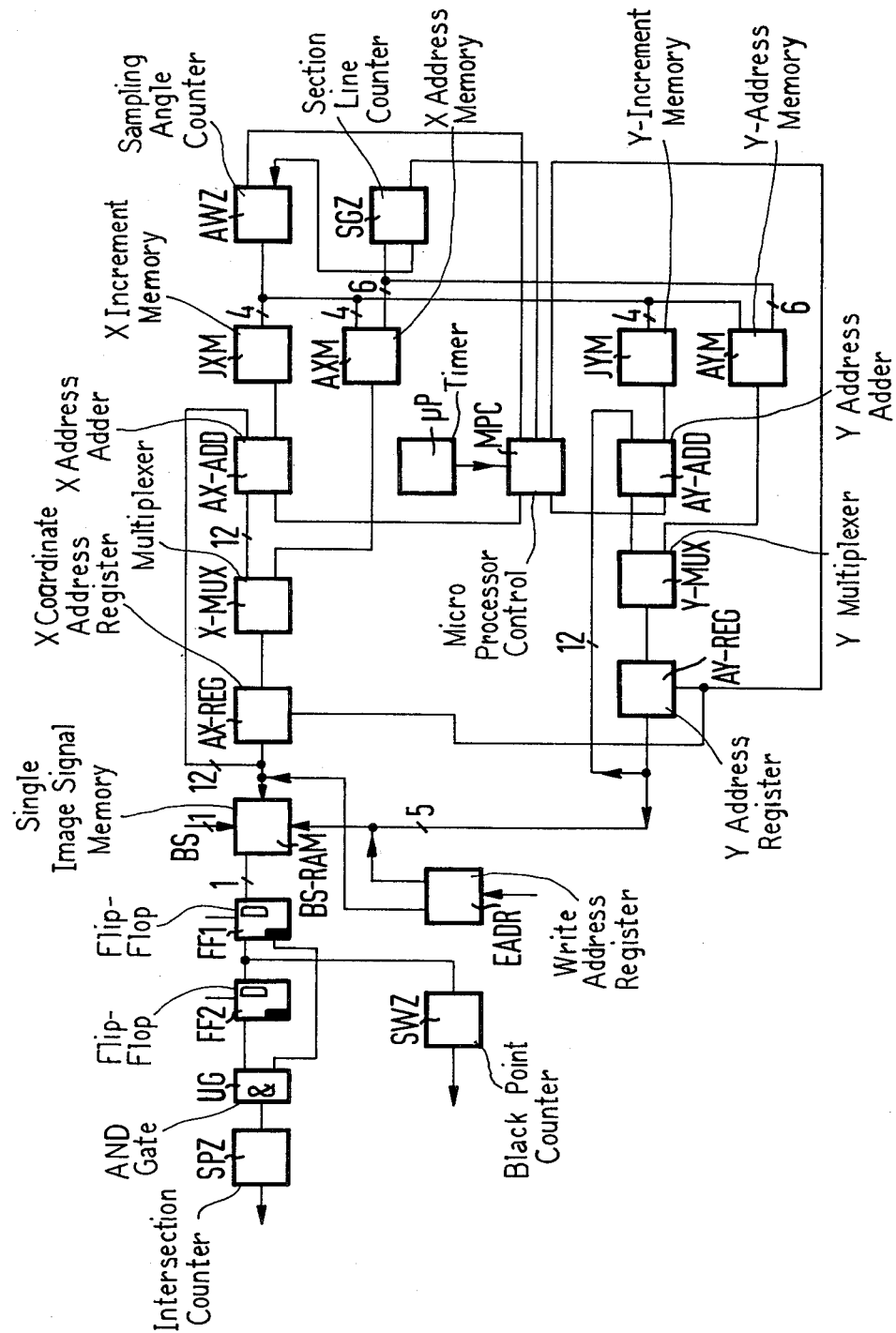

METHOD AND CIRCUIT ARRANGEMENT FOR FORMATION OF FEATURES FOR AUTOMATIC CHARACTER RECOGNITION

BACKGROUND OF THE INVENTION

The invention relates to a method for automatic character recognition, object classification, or the like. An opto-electrical transducer is employed for sampling a respective character column-wise, said transducer comprising a series of photo sensors and its output signals being deposited in a following image signal memory as an image pattern matrix consisting of black-white values and corresponding to the sampled character.

Various classification methods have become known in the field of character recognition. One of these known methods is the so-called matrix analysis method in which the sampled character is intermediately stored in a memory as a mosaic image in the form of a matrix consisting of black and white image points for further evaluation. This occurs in such manner that specific image points and image point combinations which characterize the shapes of the various characters and their mutual deviations as best possible are selected from said matrix.

SUMMARY OF THE INVENTION

An object of the present invention is to develop a method for character recognition, which, in comparison to known character recognition methods, guarantees an increased read certainty with respect to a respectively identical plurality of character classes to be distinguished.

Proceeding from a method initially described in greater detail, this object is achieved by employing an opto-electrical transducer which samples the respective character or object column-wise. Output signals from the transducer are placed in a following image signal memory as an image pattern matrix comprised of black-white levels and corresponding to the sampled character or object. The stored image pattern matrix is read out analogously to a character sampling at different sampling angles with a respective plurality of section lines numbered for identification running in accordance with sampling angles. A respective number of intersections resulting between the section lines and the character or object is determined for each section line for each sampling angle in the form of black/white level or white/black level transitions. The inner sections identified for each sampling angle and section line are determined, supplied to a classifier and evaluated such that (a) a sampling range of the numbered section lines which intersect the respective character at least once for each sampling angle is determined; (b) a sum of the intersections for all section lines for each sampling angle are determined; (c) a center of gravity of the sampling range is determined by a quantitative distribution of intersections of the section lines for each sampling angle; and (d) a scatter of the intersections within the sampling range related to said center of gravity is determined for analysis of whether the section lines with higher intersection counts lie closer to the edge of the character or closer to the area of the center of the character.

BRIEF DESCRIPTION OF THE DRAWINGS

FIG. 5 is a basic circuit diagram of a circuit arrangement for implementation of the inventive method; and FIG. 6 is a circuit diagram for a system which derives the intersections between the characters and a multitude of section lines.

DESCRIPTION OF THE PREFERRED EMBODIMENTS

Figure 1:
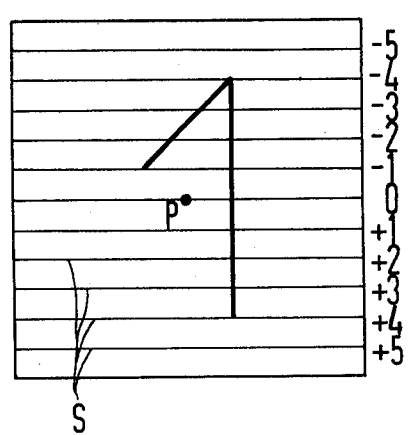
FIGS. 1-4 illustrate the sampling of a character given different sampling angles.
Figure 2:
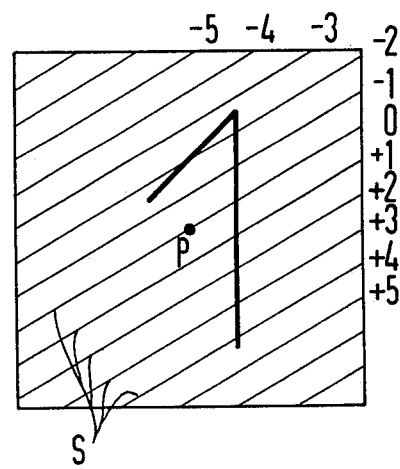
Figure 3:
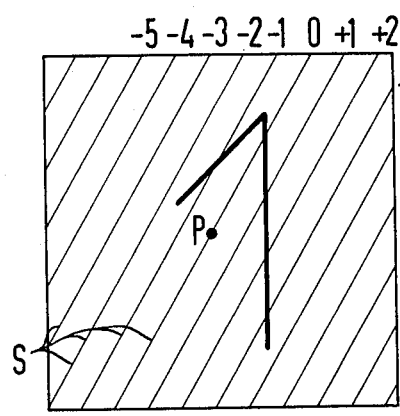
Figure 4:
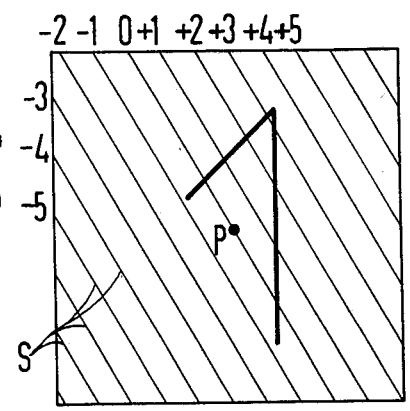

FIGS. 1-4 show a character which, for example, represents the numeral "1" and which is respectively swept by a multitude of section lines S at various angular degrees between 0° and 180°. In the illustrated example, the overall angular range from 0° through 180° is subdivided into equal angular distances so that, given the selection of an angular distance of 30°, a total of six different sampling angles derive which lie at 0° (FIG. 1), 30° (FIG. 2), 60° (FIG. 3), 90°, 120° (FIG. 4) and 150°.

An opto-electrical transducer, which, for example, consists of a series of equidistantly disposed photosensors, serves as the sampling unit, said photo sensors sampling the character columnwise in the direction of the multitude of section lines S. The photo sensors or, respectively, the section lines n allocated to them are referenced with $-5, -4, -3, \ldots 0, 1, \ldots +4, +5$. What is thereby significant is that, in the sampling, the mean section line O intersects a virtual point P at various angular degrees, said virtual point P being randomly selectable but always fixed. The character evaluation now ensues in such manner that the respective number of intersections between the section lines and character deriving per sampling angle for each section line n is first determined. The following table shows the number of intersections for each sampling angle $\alpha$ related to the respective section line n according to the example according to FIGS. 1-4.

| | | | | | $\eta$ | | | | | | |
|---|---|---|---|---|---|---|---|---|---|---|---|
| $\alpha$ | −5 | −4 | −3 | −2 | −1 | 0 | 1 | 2 | 3 | 4 | 5 |
| 0° | 0 | 1 | 2 | 2 | 2 | 1 | 1 | 1 | 1 | 1 | 0 |
| 30° | 0 | 0 | 0 | 2 | 1 | 1 | 1 | 1 | 1 | 1 | 0 |
| 60° | 0 | 0 | 0 | 0 | 1 | 1 | 1 | 1 | 1 | 0 | 0 |
| 120° | 0 | 0 | 0 | 0 | 0 | 2 | 2 | 2 | 2 | 0 | 0 |

The following features, which are necessary for evaluation of the character, are now formed from these intersection data. The first feature (a) derives from the number of section lines which form at least one intersection with the sampled character. Deriving therefrom is the sampling range for the respective number of section lines which, according to the example illustrated in the table, extends from the section line −4 up to the section line +4 given the sampling angle 0°, i.e. encompasses a total of nine section lines. Given the sampling angle 30°, the sampling range lies between the section lines −2 and +4, and, accordingly, comprises a total of seven section lines. Given the sampling angle 60°, there are five section lines and, finally, there are four section lines given the sampling angle 120°. These sums of section lines identified with respect to the individual sampling angles produce a first recognition criterion, namely with respect to the outline of the character Z.

The second feature (b) results from the sum of intersections for all of the section lines for each sampling angle. In the example selected, 12 derives as the sum of intersections for the sampling angle $\alpha=0°$, whereas the respective sum values amount to 8, 5 and 8 for given sampling angles of 30°, 60° or 180°. This second feature (b) is already characteristic of the continuous lines of the respective character.

As a third feature (c), the so-called center of gravity of the character is formed from the intersection data, i.e. from their quantitative distribution within the section line range respectively covered. With the assistance of this feature (c), it already becomes possible to distinguish the numeral "6" from a numeral "6" which is upside down, i.e. from the numeral "9."

Finally, the so-called scatter is determined with respect to the center of gravity according to feature (c) as a fourth feature (d). Said scatter provides evidence concerning whether the section lines with higher intersection counts lie closer to the edge of the character or closer to the area of the center of the character, i.e., in the near range of the mean section line O. Additional discrimination criteria beyond that can be gained in that the sampling range per sampling angle is subdivided into a positive and into a negative range with respect to a mean section line O of the multitude of section lines and each of said two areas is separately evaluated with respect to the features (a) and (d).

Finally, the certainty of discrimination can be further increased in that the sum of black level matrix points occurring for each section line in the image pattern matrix along said section line is identified per sampling angle and, on the basis of said black levels of all section lines per sampling angle, the center of gravity within the sampling area and the scatter with respect to said center of gravity are determined. Here, too the scatter can be separately identified for the positive and negative range of the multitude of section lines.

A circuit arrangement for the implementation of the character recignition method explained on the basis of FIGS. 1–4 is shown in basic diagram in FIG. 5. In detail, said FIG. 5 shows a sampling optics L by means of which the character Z illustrated as a "1" to be sampled is imaged column-wise on a row of photo diodes of an opto-electrical transducer W. The output signals of said transducer W are again deposited in a following image signal memory BS as an image pattern matrix consisting of black-white values or levels and corresponding to the sampled character.

By means of a corresponding addressing, there is now the possibility of reading out the matrix at different, freely selectable angular lines whereby a sampling of the character at different sampling angles can be simulated in an advantageous manner. In these read-out operations, the respective plurality of black points occurring along each section line as well as the plurality of intersections deriving between the section lines and character in the form of black/white level transitions or white/black level transitions is identified for each individual group of section lines and is deposited as a corresponding numerical value in a following black point-/intersection point memory SPS. Proceeding from said black point/intersection point numerical values, the feature magnitudes (a), (b), (c), (d) already mentioned in conjunction with FIGS. 1 through 4 are then identified with the assistance of a microprocessor and are finally supplied to a classifier for the final identification of the respectively sampled character Z. The corresponding circuit consists of an arithmetic unit RW following the point of intersection/black point memory SPS, said arithmetic unit RW having a multiplication and accumulator stage, further consists of a feature memory MS as well as of a microcomputer system with a central processing unit CPU, a working memory AS and a program storage PS. The individual components are linked to one another via a bus system which consists of the data bus D-Bus and the address bus A-Bus. An intermediate register ZR is pre-connected to one of the two inputs of the arithmetic unit which are connected to the data bus D-Bus, whereas an address register A-REG connected to the address bus A-Bus is allocated to the point of intersection/black point memory SPS. In accordance with the programs deposited in the program storage PS, the central processing unit CPU controls the calculation of the feature magnitudes (a), (b), (c), (d). The multiplication stage in the arithmetic unit RW is required since the central processing unit CPU does not have a multiplication command at its disposal. The working memory AS serves for the acceptance of the intermediate results and tables for the division and formation of squares. For the calculation of the feature magnitude (a), all point of intersection numbers for the respective sampling angle are successively read out of the point of intersection/black point memory SPS. The central processing unit CPU then checks to see whether they are equal to zero. If that is not the case, the accumulator stage in the arithmetic unit RW is increased by the value one. The respective result, finally, is deposited in the feature memory MS.

In order to form the feature magnitude (b), the numbers of points of intersection are again read out from the point of intersection/black point memory SPS and are directly summed in the accumulator stage of the arithmetic unit RW. The result is again deposited in the feature memory MS.

The feature magnitude (c) requires two processes. In the first read-out of the numbers of points of intersection from the point of intersection/black point memory SPS, the number of the appertaining section lines is summed up in the accumulator stage for each point of intersection number which differs from zero. The result is divided by the appertaining feature value (a) from the feature memory MS by means of a division table in the working memory AS and is deposited in the working memory AS. In the second read-out of the numbers of points of intersection from the point of intersection/black point memory SPS, these are directly multiplied in the multiplication stage of the arithmetic unit RW by the number of appertaining section lines and are likewise summed up in the accumulator. The result is divided by the appertaining feature value (b) from the feature memory MS. Its difference from the value from the working memory AS identified in the first process is the feature c and is likewise deposited in the feature memory MS.

In order to form the featuremagnitude (d), the appertaining feature (c) is first read out from the feature memory MS and is transmitted to the central processing unit CPU. For each intersection line number, the difference between the feature magnitude (c) and said number is formed in the central processing unit CPU. Said difference is squared by means of a table in the working memory AS and is supplied to the multiplication stage of the arithmetic unit. There, said value is multiplied by the appertaining point of intersection number from the point of intersection/black point memory and the result is summed in the accumulator stage. At the end of this process, the accumulated value is divided by the value of the appertaining feature magnitude (b) by means of the central processing unit CPU and the division table in the working memory AS. The result is the value of the feature magnitude (d) and is likewise deposited in the feature memory MS.

An exemplary circuit for identifying the black points or, respectively points of intersections deriving between the character and the multitude of section lines is illustrated in FIG. 6. It shows a single image signal memory BS-RAM to which a respective X-coordinate address register AX-REG or, respectively, a Y-coordinate address register AY-REG are allocated. Via a respective multiplexer X-MUX, Y-MUX, both address registers AX-REG, AY-REG are respectively connected to a coordinate-related address memory AXM, AYM and to an address adder AX-ADD, AY-ADD. At their input side, the two address adders AX-ADD, AY-ADD are linked to a respective increment memory IXM, IYM and to the output of the respectively appertaining address register AX-REG, AY-REG. The two address memories AXM, AYM with, for example 512×12 bit locations, and the two increment memories IXM, IYM with, for example, 12×12 bit locations can be driven by means of a sampling angle counter AWZ, and the two address memories AXM, AYM can be additionally driven by means of a section line counter SGZ. Moreover, the section line counter SGZ also controls the sampling angle counter AWZ.

This circuit illustrated in FIG. 6 functions in detail as follows. Respectively controlled by means of a write address register EADR, the respective image signals BS allocated to a character are deposited in the image signal memory BS-RAM as an image pattern matrix consisting of black-white levels and corresponding to the sampled character. Moreover, the sampling angle counter AWZ and the section line counter SGZ which were previously set to zero by means of a microprocessor control MPC are set to the respective first sampling angle α or, to the respective first section line for said sampling angle. Given a fixed sampling angle, each section line now has a precisely determined point of origin whose X- or, respectively Y-starting address is stored in the X- or, respectively Y-address memory AXM or AYM. The signals from AXM then pass via the X multiplexer X-MUX and through the address register AX-REG to the image signal memory BS-RAM. Similarly the signals from AYM pass via the Y multiplexer Y-MUX and through the Y address register AY-REG to the memory BS-RAM from which the first image point can then be read out. On the basis of the sampling angle respectively set, there then results a clear statement concerning the sampling direction; and with respect to the position of the next sampling point, the change of position is determined by means of a specific increment both in the X direction as well as in the Y direction. Such angle-specific increments are read out of a X- or Y-increment memory IXM or IYM respectively, and are added to the respective current address in the X- or Y-address adder AX-ADD or AY-ADD, respectively. The addresses increased in this manner form the output signals of the two address adders AX-ADD and AY-ADD and, via the multiplexer S-MUX or Y-MUX and the two address registers AX-REG and AY-REG, they likewise arrive at the image signal memory BS-RAM from which the next respective image point is then read out. This continues until addresses are produced in the address registers AX-REG, AY-REG which no longer lie in the address range of the image signal memory BS-RAM. In this case, the section line counter SGZ is activated by the microprocessor control MPC and is increased by the value "1."

Proceeding from the respective new starting address for the respective next section line, the method just described is repeated until the last section line has been analyzed. Subsequently, the sampling angle counter AWZ is set to the next sampling angle, so that the overall method, beginning with the respective first section line, can again begin from the beginning. This continues until, with the last section line of the last sampling angle, the overall image pattern has been analyzed. The inscription of a new image pattern subsequently ensues and this can then be read out in an analogous manner.

The image signals read out of the image signal memory BS-RAM are now separately evaluated with respect to the plurality of black points and with respect to the plurality of intersections. For this purpose, a first D-flip flop FF1 is provided whose output is connected to a black point counter SWZ. A further D-flip flop FF2 connected in series to the first is provided for the evaluation of the intersection, the output of said further D-flip flop FF2 being linked via an AND element UG to the inverted output of the first D-flip flop FF1. Said AND element UG always supplies an output signal registered by an intersection counter SPZ when a change from black levels to white levels or vice versa occurs in the output signals of the image signal memory BS-RAM.

The circuit of FIG. 5 in a preferred embodiment employs the following Texas Instrument modules:

SPS=RAM 2114; A-REG=74 LS 273; RW=TDC 1008J; MS, AS=8155; CPU=8085; PS=8755; ZR=74 LS 244.

The circuit of FIG. 6 in a preferred embodiment employs the following Texas Instrument modules:

SPZ, SWZ, AWZ, SGZ=74 LS 163; UG=74 LS 08; FF1, FF2=74 LS 74; BS-RAM=2147 EADR=74 LS 244; AX-REG, AY-REG=74 LS 374; X-MUX, Y-MUX=74 LS 157; AX-ADD, AY-ADD=74 LS 283; IXM, AXM, IYM, AYM-PROM 6341; MPC, μP=μP-System 8085.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A method for the formation of features for automatic character or object recognition by employment of an opto-electrical transducer which samples the respective character or object column-wise, said transducer being comprised of a series of photo sensors, comprising the steps of: placing output signals of the photo sensors in a following image signal memory as an image pattern matrix comprised of black-white levels and corresponding to the sampled character or object; reading out the stored image pattern matrix analogously to a character sampling at different sampling angles with a respective plurality of section lines numbered for identification for each of said sampling angles; and determining a respective number of intersections resulting between the section lines and the character or object for each section line for each sampling angle in the form of black/white level or white/black level transitions; and utilizing the intersections identified for each sampling angle and section line occurring in such manner for the formation of features for the automatic character or object recognition, said features comprising:
  (a) a sampling range of the numbered section lines which intersect the respective character at least once for each sampling angle,
  (b) a sum of the intersections for all section lines for each sampling angle,
  (c) a center of gravity of the sampling range determined by a quantitative distribution of intersections of section lines for each sampling angle, and
  (d) a scatter of the intersections within the sampling range related to said center of gravity to determine whether section lines with higher intersection counts lie closer to the edge of a character or closer to the area of the center of the character.

2. A system for automatic character or object recognition, comprising: an opto-electrical transducer means for sampling a respective character or object columnwise; output signals from the transducer connecting to an image signal memory; means for storing an image pattern as a matrix corresponding to said sampling; means for reading out the stored image pattern matrix analogously to a character sampling at different sampling angles; output signals of said image signal memory means being stored in a black point/intersection memory means as black points as well as points of intersection deriving between the character or object and the plurality of section lines; and classification circuit means for evaluating the intersections for each section line and sampling angle, said classification circuit means determining
  (a) a sampling range of the numbered section lines which intersect the respective character at least once for each sampling angle,
  (b) a sum of the intersections for all section lines for each sampling angle,
  (c) a center of gravity of the sampling range by a quantitative distribution of intersections of section lines for each sampling angle, and
  (d) a scatter of the intersections within the sampling range related to said center of gravity to determine whether section lines with higher intersection counts lie closer to the edge of the character or object or closer to the area of the center of the character or object.

* * * * *